(12) United States Patent
Cmich

(10) Patent No.: US 9,738,311 B2
(45) Date of Patent: Aug. 22, 2017

(54) STEERING ASSEMBLY FOR A RIDING LAWN MOWER

(71) Applicant: MTD Products Inc, Valley City, OH (US)

(72) Inventor: Ryan Cmich, Valley City, OH (US)

(73) Assignee: MTD PRODUCTS INC, Valley City, OH (US)

( * ) Notice: Subject to any disclaimer, the term of this patent is extended or adjusted under 35 U.S.C. 154(b) by 0 days.

(21) Appl. No.: 15/005,271

(22) Filed: Jan. 25, 2016

(65) Prior Publication Data

US 2016/0214644 A1 Jul. 28, 2016

Related U.S. Application Data

(60) Provisional application No. 62/107,585, filed on Jan. 26, 2015.

(51) Int. Cl.
| | |
|---|---|
| *B62D 7/12* | (2006.01) |
| *B62D 3/02* | (2006.01) |
| *B62D 7/08* | (2006.01) |
| *B62D 7/18* | (2006.01) |
| *A01D 101/00* | (2006.01) |
| *A01D 34/64* | (2006.01) |

(52) U.S. Cl.
CPC .............. *B62D 7/12* (2013.01); *B62D 3/02* (2013.01); *B62D 7/08* (2013.01); *B62D 7/18* (2013.01); *A01D 34/64* (2013.01); *A01D 2101/00* (2013.01)

(58) Field of Classification Search
CPC ... B62D 7/12; B62D 7/08; B62D 3/02; B62D 7/18
See application file for complete search history.

(56) References Cited

U.S. PATENT DOCUMENTS

| | | | |
|---|---|---|---|
| 1,228,980 A * | 6/1917 | Smith | B62D 13/04 280/100 |
| 3,027,963 A | 4/1962 | Nicholson | |
| 3,587,767 A | 6/1971 | Gamaunt | |
| 5,048,853 A * | 9/1991 | Trefz | B62D 7/1527 180/411 |
| 5,099,714 A * | 3/1992 | Hutchison | B62D 3/12 74/422 |
| 5,311,957 A | 5/1994 | McLaurin et al. | |
| 6,185,920 B1 | 2/2001 | Oxley | |
| 6,196,342 B1 | 3/2001 | Teal et al. | |
| 6,257,357 B1 | 7/2001 | Teal et al. | |

(Continued)

OTHER PUBLICATIONS

International Search Report and Written Opinion for International Application No. PCT/US2016/014681 dated Jun. 16, 2016.

*Primary Examiner* — Faye M Fleming

(74) *Attorney, Agent, or Firm* — Wegman, Hessler & Vanderburg

(57) ABSTRACT

A steering assembly for a lawn maintenance vehicle having a control assembly that receives a user rotational input, a transfer assembly for transferring the rotational input from the user to a pair of wheel assemblies. Each wheel assembly includes a knuckle connected to a pivot bar by way of a kingpin, wherein the kingpin is positioned within the rim of the tire operatively connected to the knuckle. The transfer assembly includes a sector gear having a leading edge that forms a rack that is meshingly engaged to a pinion gear of the transfer assembly.

13 Claims, 11 Drawing Sheets

(56) References Cited

U.S. PATENT DOCUMENTS

| | | |
|---|---|---|
| 6,325,396 B1 | 12/2001 | Romig |
| 6,354,388 B1 | 3/2002 | Teal et al. |
| 6,454,032 B1 | 9/2002 | Teal et al. |
| 6,484,827 B2 | 11/2002 | Teal et al. |
| 6,540,633 B1 | 4/2003 | Hasegawa et al. |
| 6,601,663 B2 | 8/2003 | Hauser |
| 6,904,985 B2 | 6/2005 | Ferree et al. |
| 6,921,109 B2 | 7/2005 | Hutchison et al. |
| 7,017,327 B2 | 3/2006 | Hunt et al. |
| 7,108,096 B1 | 9/2006 | Oxley et al. |
| 7,237,629 B1 | 7/2007 | Bland et al. |
| 7,347,434 B2 | 3/2008 | Lewis et al. |
| 7,383,916 B2 * | 6/2008 | Genz .............. B62D 7/142 180/408 |
| 7,389,998 B2 | 6/2008 | Kondo et al. |
| 7,914,022 B2 | 3/2011 | Ruebusch et al. |
| 7,922,184 B2 | 4/2011 | Porcheron |
| 8,136,613 B2 | 3/2012 | Schaedler et al. |
| 8,205,897 B2 | 6/2012 | Avigni |
| 8,950,521 B2 * | 2/2015 | Piontek ............ A01D 34/006 180/6.32 |
| 9,487,233 B2 * | 11/2016 | Reep .............. F16H 1/2863 |
| 2003/0155735 A1 | 8/2003 | Takahashi et al. |
| 2006/0157948 A1 | 7/2006 | Genz |
| 2007/0138754 A1 * | 6/2007 | Moreau ............. B60B 27/00 280/93.512 |
| 2008/0191439 A1 | 8/2008 | Huang |
| 2008/0283326 A1 | 11/2008 | Bennett |
| 2011/0036190 A1 | 2/2011 | Huang |
| 2013/0249179 A1 * | 9/2013 | Burns, Jr. ........... B62D 3/02 280/93.504 |
| 2014/0298767 A1 | 10/2014 | Piontek |

\* cited by examiner

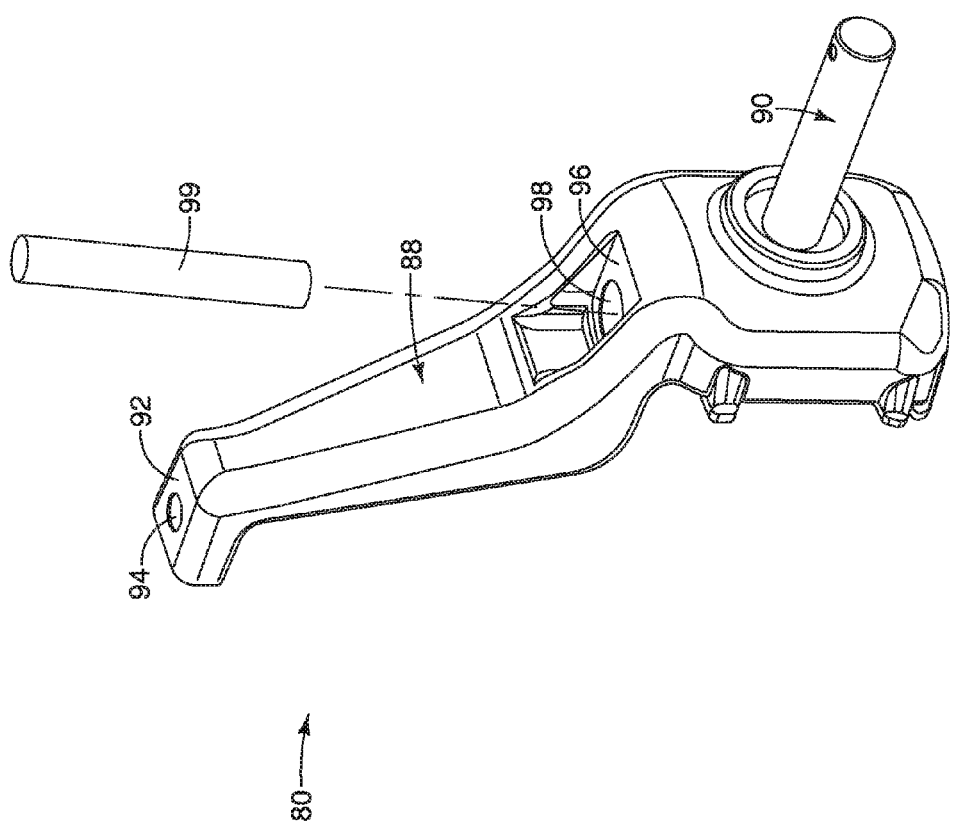

STEERING ASSEMBLY FOR A RIDING LAWN MOWER

CROSS REFERENCE TO RELATED APPLICATION

The application claims the benefit of U.S. Provisional Application No. 62/107,585, filed Jan. 26, 2015, the entire disclosure of which is hereby incorporated herein by reference.

FIELD OF THE INVENTION

The present invention is directed to a riding lawn mower or tractor, and more particularly, to the steering assembly for allowing the lawn mower or tractor to have a small turning radius.

BACKGROUND OF THE INVENTION

Steering is a term often applied to the collection of components, linkages, and the like which will allow for a driven machine to follow a desired course. Conventional steering arrangements are typically operated by a user rotating a hand-operated steering which results in the front wheels turning to the desired angle. The steering wheel is typically connected to a shaft that drives a pinion gear which then drives a rack. Steering torque is provided to the kingpins of the wheels via tie rods connected to the rack.

Ackermann steering geometry is a geometric arrangement of linkages in the steering of a machine designed to solve the problem of wheels on the inside and outside of a turn needing to trace out circles of different radii. An approximation to perfect Ackermann steering geometry may be generated by moving the steering pivot points inward so as to lie on a line drawn between the steering kingpins and the center of the rear axle. With perfect Ackermann, at any angle of steering, the centre point of all of the circles traced by all wheels will lie at a common point (where lines which are respectively perpendicular to individual tires, meet). Perfect Ackermann allows for the least amount of wear on tires, but it may be difficult to arrange in practice with simple linkages, especially for small radius turns.

BRIEF SUMMARY OF THE INVENTION

In one aspect of the present invention, a steering assembly for a lawn maintenance vehicle is provided. The lawn maintenance vehicle includes a frame. The steering assembly includes a control assembly having a steering wheel operatively connected to a pinion gear for generating a first rotational output. The steering assembly also includes a transfer assembly including a sector gear a pair of tie rods, wherein the sector gear is operatively connected to the frame and rotatable relative thereto. The sector gear has an arcuate leading edge forming a rack that is meshingly engaged with the pinion gear for receiving the first rotational output. A lobe extends rearwardly from each end of the leading edge. A tie rod is operatively connected to each lobe. The steering assembly further includes a pair of wheel assemblies, wherein each tie rod of the transfer assembly is attachable to one of the wheel assemblies. Movement of the tie rods in response to rotation of the sector gear causes the wheel assemblies to rotate.

In another aspect of the present invention, a steering assembly for a lawn maintenance vehicle is provided. The steering assembly includes a control assembly having a steering wheel operatively connected to a pinion gear. Rotation of the steering wheel is directly transferred to the pinion gear to generate a first rotational output. The steering assembly also includes a transfer assembly having a sector gear and a pair of tie rods. The sector gear has a leading edge forming a rack that is meshingly engaged with the pinion gear for receiving the first rotational output. Each of the tie rods has one end connected to the sector gear. The steering assembly further includes a pair of wheel assemblies, wherein each wheel assembly includes a knuckle, a kingpin for attaching the knuckle to a pivot bar operatively connected to the frame, an axle extending the said knuckle, a rim rotatably attached to the axle, and a tire mounted on the rim. The knuckle is connected to another end of one of the tie rods. The kingpin is located within the rim.

Advantages of the present invention will become more apparent to those skilled in the art from the following description of the embodiments of the invention which have been shown and described by way of illustration. As will be realized, the invention is capable of other and different embodiments, and its details are capable of modification in various respects.

BRIEF DESCRIPTION OF SEVERAL VIEWS OF THE DRAWINGS

These and other features of the present invention, and their advantages, are illustrated specifically in embodiments of the invention now to be described, by way of example, with reference to the accompanying diagrammatic drawings, in which:

FIG. 6 is a perspective view of a knuckle;

Figure 1:
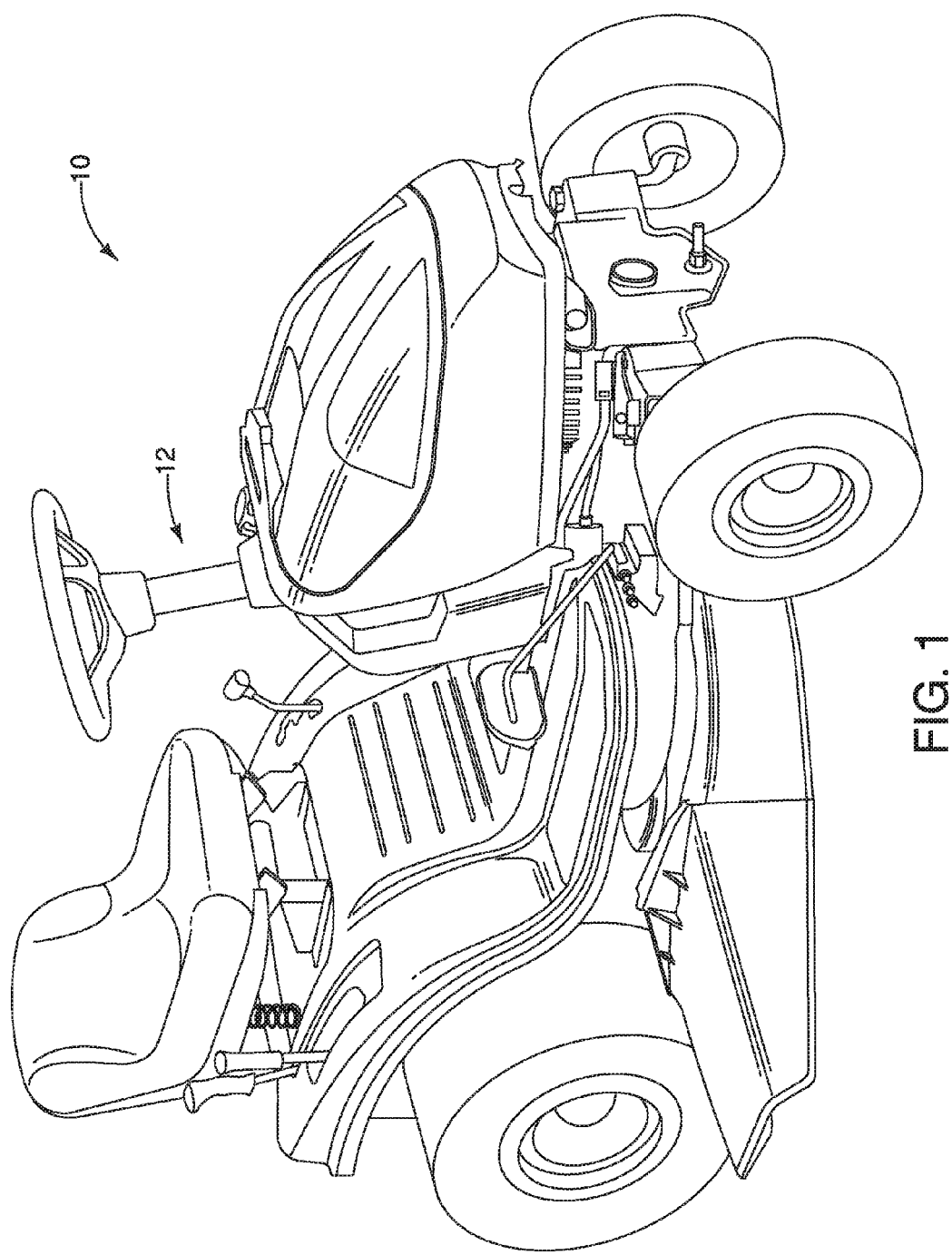
FIG. 1 is a perspective view of an embodiment of a lawn maintenance vehicle.

It should be noted that all the drawings are diagrammatic and not drawn to scale. Relative dimensions and proportions of parts of these figures have been shown exaggerated or reduced in size for the sake of clarity and convenience in the drawings. The same reference numbers are generally used to refer to corresponding or similar features in the different embodiments. Accordingly, the drawing(s) and description are to be regarded as illustrative in nature and not as restrictive.

DETAILED DESCRIPTION OF THE PREFERRED EMBODIMENT

Figure 2A:
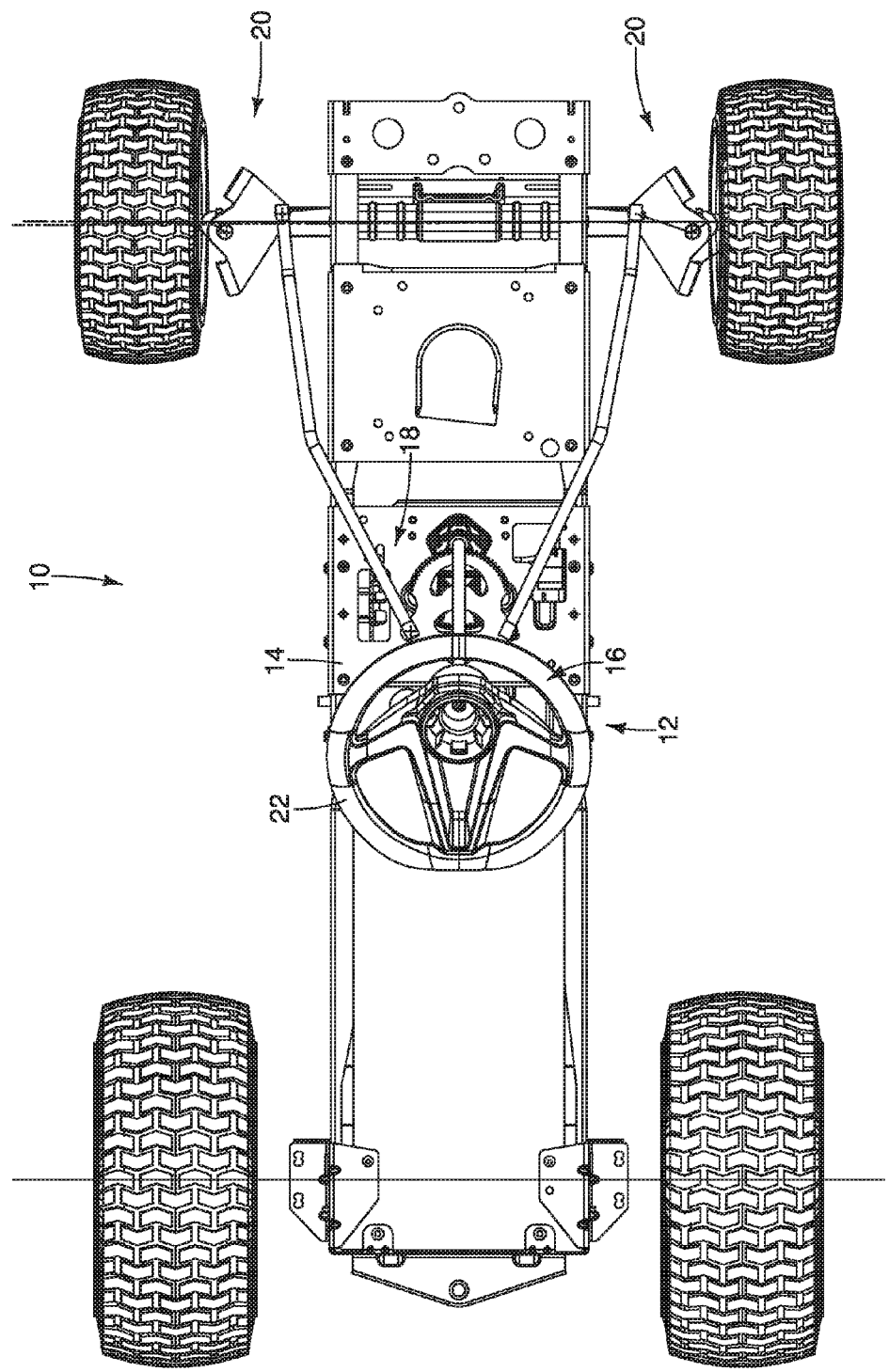
FIG. 2A is a top view of an embodiment of a steering assembly.
Figure 2B:
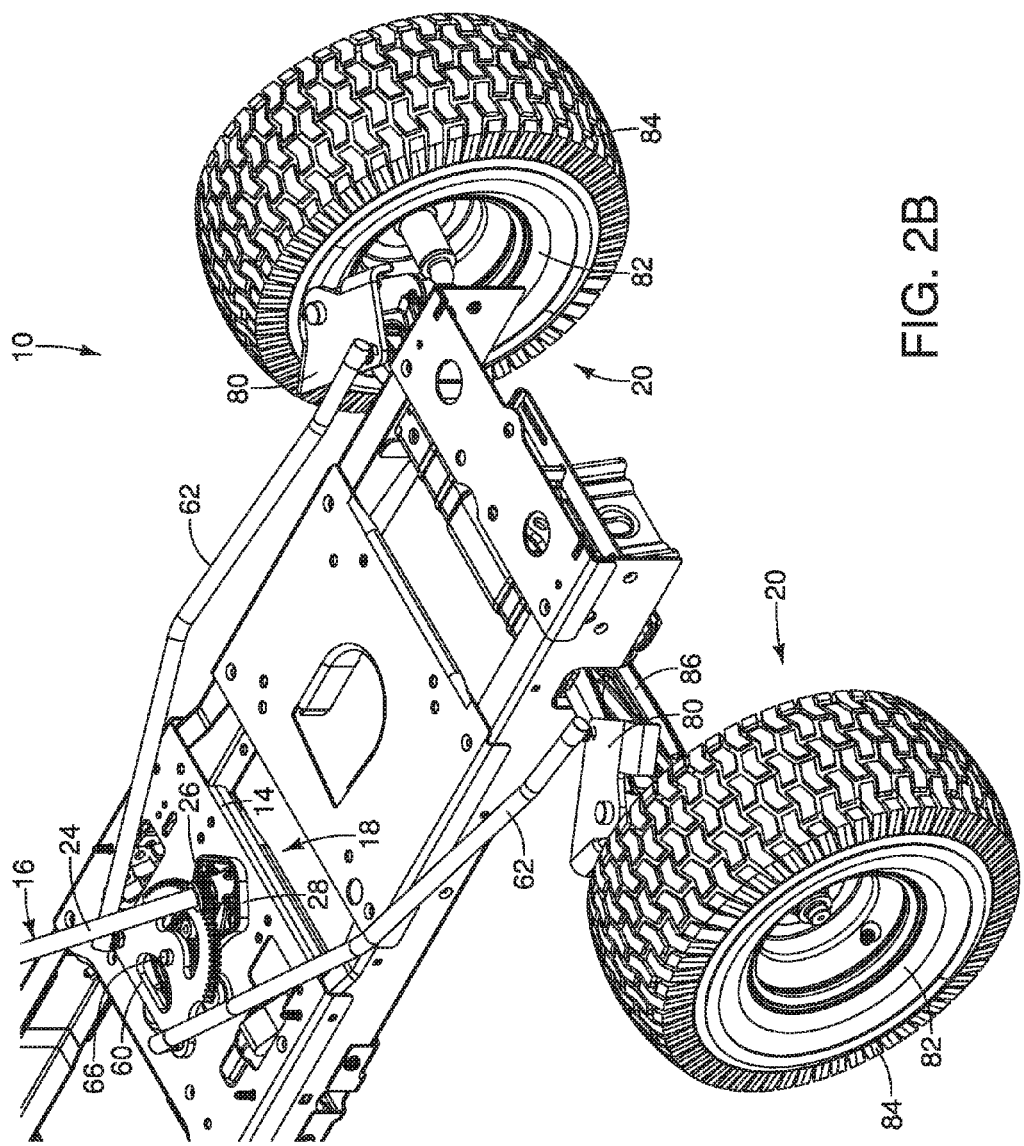
FIG. 2B is a front perspective view of the steering assembly shown in FIG. 2A.

Referring to FIGS. 1-2B, a lawn maintenance vehicle 10 having a steering assembly 12 for controlling the movement and direction of the vehicle is shown. The steering assembly 12 is operatively connected to a frame 14, which includes the frame rails and all corresponding structural supports of the lawn maintenance vehicle 10. The steering assembly 12 includes a control assembly 16 that is controllable by an operator, a transfer assembly 18 operatively connected to the control assembly 16 and receives the output from the control assembly 16, and a pair of wheel assemblies 20 which receives an input from the transfer assembly 18 which allows the wheel assemblies 20 to guide the direction of the lawn maintenance vehicle 10.

In the exemplary embodiment shown in FIGS. 2A-2B, the control assembly 16 includes a steering wheel 22, a steering shaft 24 extending from the steering wheel 22, a pinion gear 26 positioned at the opposite distal end of the steering shaft 24 as the steering wheel 22, and a support block 28 that is attached to the frame 14 and configured to receive and stabilize the distal end of the steering shaft 24. The steering wheel 22 can be any steering device or mechanism that is graspable and maneuverable by the operator, but it should be understood by one of ordinary skill in the art that the illustrated embodiment of the steering wheel 22 is configured to output rotational movement to the steering shaft 24. Rotation of the steering wheel 22 results in corresponding rotation of the pinion gear 26 positioned adjacent to the distal end of the steering shaft 24 opposite the steering wheel 22.

An exemplary embodiment of the steering shaft 24 is shown in FIGS. 2A-2B. The steering shaft 24 is an elongated cylindrical tubular shaft having opposing distal ends, wherein the first distal end includes a plurality of longitudinal grooves or splines formed on the circumferential surface of the steering shaft 24. These grooves/splines correspond to similar grooves/splines formed on the steering wheel 22, thereby allowing the steering wheel 22 to be easily—and removably—attached to the first distal end of the steering shaft 24. The opposing second distal end of the steering shaft 24 includes a projection extending longitudinally from the end of the steering shaft 24, wherein the projection is received by the support block 28. Adjacent to the second distal end is also a shoulder that extends radially outward from the circumferential surface of the steering shaft 24. The shoulder is spaced apart from the end of the steering shaft 24. Splines are positioned immediately adjacent to the shoulder and located between the shoulder and the projection. The splines are configured to receive the pinion gear 26, as will be explained below, and the ribs/grooves of the splines are aligned generally parallel to the longitudinal axis of the steering shaft 24.

In the embodiment shown in FIGS. 2A-2B, the pinion gear 26 is a generally round, annular member having splines formed along the inner circumferential surface and gear teeth extending radially outward from the outer circumferential surface. The inner splines of the pinion gear 26 are configured to mesh with the splines of the steering shaft 24 to allow the pinion gear 26 to be securely attached to the steering shaft 24, wherein rotation of the steering shaft 24 is transferred to the pinion gear 26 by way of the meshed splines. The pinion gear 26 is attached or otherwise positioned on the steering shaft 24 such that the pinion gear 26 abuts the shoulder of the steering shaft 24.

Figure 3:
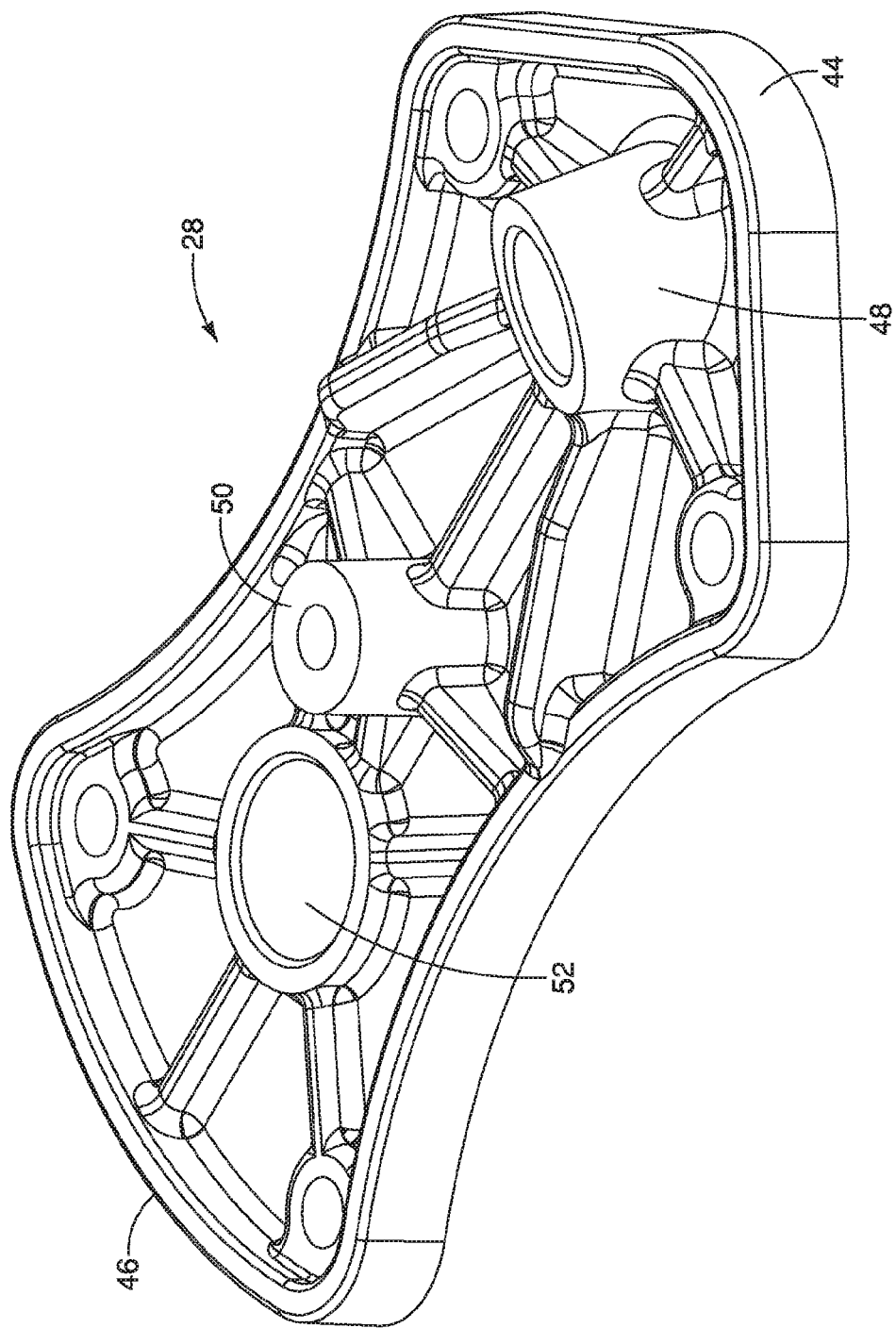
FIG. 3 is a top perspective view of an embodiment of a support block.

The projection extending from the second distal end of the steering shaft 24 is received in the support block 28, as shown in FIGS. 2A-2B. An exemplary embodiment of a support block 28 of the control assembly 16 is shown in FIG. 3. The support block 28 is an elongated member having a forward end 44 and an opposing rearward end 46, and the support block 28 is attached to the frame 14 of the lawn maintenance vehicle 10. The support block 28 includes a receiving boss 48 that extends rearwardly at an angle. The receiving boss 48 is positioned adjacent to the forward end 44, and the receiving boss 48 is formed as a tubular shape having a detent or passageway formed through the longitudinal center which is configured to receive the projection 34 of the steering shaft 24. The angle of the receiving boss 48 allows the steering shaft 24 to likewise be aligned at an angle, thereby extending between the support block 28 and the steering wheel 22.

An exemplary embodiment of the support block 28, as shown in FIG. 3, further includes a guide boss 50 located generally centrally between the forward and rearward ends 44, 46. The guide boss 50 extends upwardly in a substantially vertical manner. The guide boss 50 is configured to be received by the sector gear 60 of the transfer assembly 18, as will be explained below. The guide boss 50 is a substantially cylindrical projection. The support block 28 further includes an aperture 52 formed vertically through the thickness of the support block 28. The aperture 52 is located adjacent to the rearward end 46 and between the guide boss 50 and the rearward end 46. The aperture 52 is configured to receive a 66 (FIG. 2B) about which the sector gear 60 rotates.

The control assembly 16 is configured to receive user input through rotation of the steering wheel 22, wherein rotation of the steering wheel 22 generates a rotational output of the control assembly 16 by way of rotation of the pinion gear 26. The rotation is transferred from the steering wheel 22 to the pinion gear 26 by the steering shaft 24, wherein rotation of the pinion gear 26 generates the output from the control assembly 16 which is transferred to the transfer assembly 18.

Figure 4:
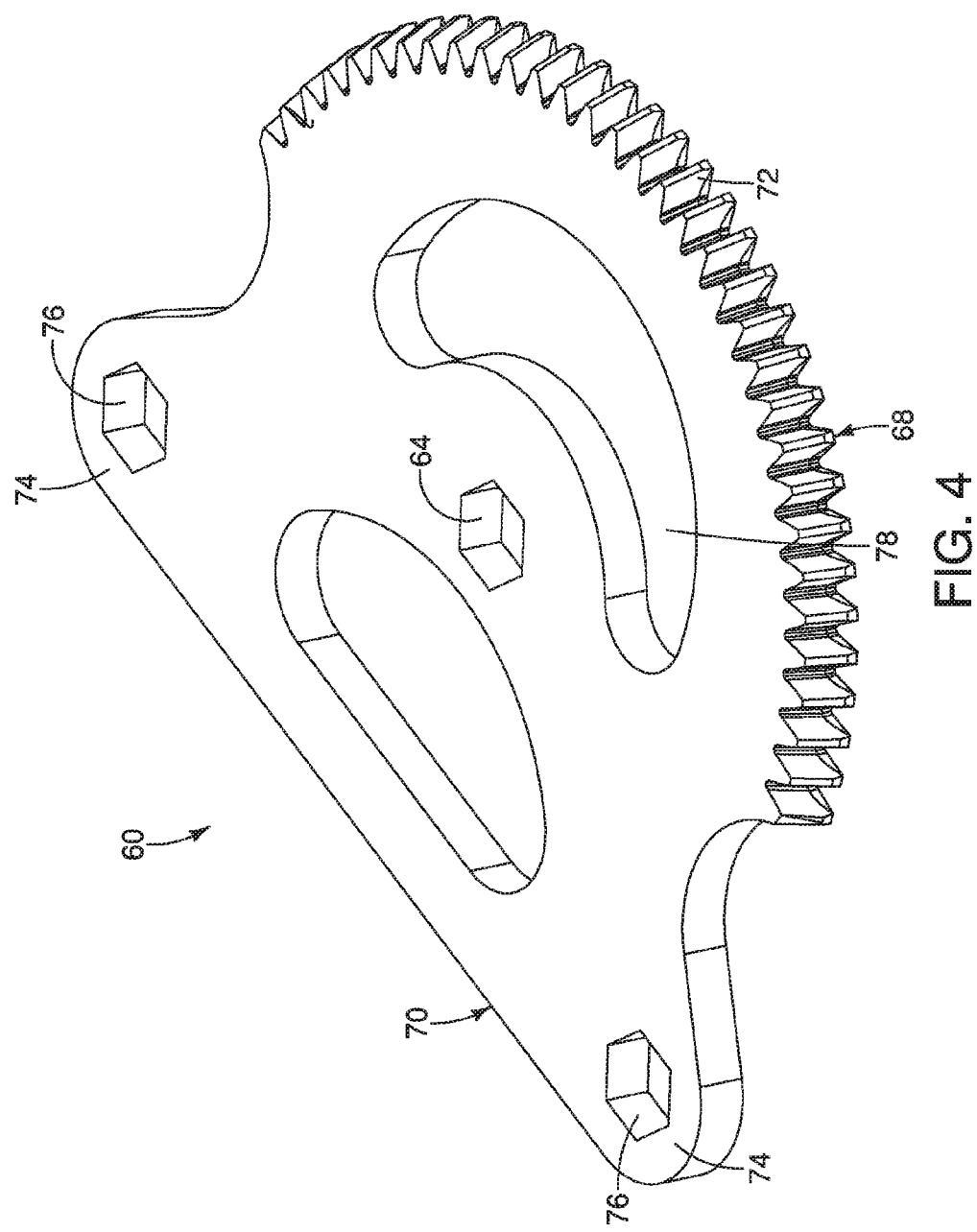
FIG. 4 is a top perspective view of an embodiment of a sector gear.

In the exemplary embodiment illustrated in FIGS. 2A-2B, the transfer assembly 18 includes a sector gear 60 and a pair of tie rods 62 operatively connected to, and extending from, the sector gear 60. An exemplary embodiment of a sector gear 60 is shown in FIG. 4, wherein the sector gear 60 is formed as a generally flat member having a leading edge 68 and an opposing trailing edge 70. The sector gear 60 includes a central aperture 64 located near the center thereof. The central aperture 64 allows the sector gear 60 to be rotatably connected to the frame 14 of the vehicle 10 by way of the support block 28. As shown in FIG. 2B, the central aperture 64 receives a pin 66 that operatively connects the sector gear 60 to the support block 28, thereby providing an axis of rotation of the sector gear 60 about the pin 66.

The leading edge 68 of the sector gear 60 is formed as an arcuate edge, being generally semi-circular, as shown in FIG. 4. A plurality of teeth extend radially outward from the leading edge 68, thereby forming a rack 72, wherein the teeth of the rack 72 are configured to mesh with the teeth 42 of the pinion gear 26 to form a rack-and-pinion connection therebetween. Although typical rack-and-pinion connections are substantially linear due to a linear rack, the rack-and-pinion connection in the illustrated embodiment is an arcuate rack-and-pinion connection. The steering shaft 24 engages the sector gear 60 at the leading edge 68 thereof, which allows for the sector gear 60 to be rotated past over-center during a tight turn. The arc-length of the rack 72 allows the sector gear 60 to rotate about 90° in each direction (clockwise and counter-clockwise) relative to the longitudinal centerline of the sector gear 60. It should be understood by one having skill in the art that the rack 72 may provide any range of rotation relative to the support block 28 between about 10° to about 220° or more. The rack 72 provides a limit to the amount of allowable rotation of the sector gear 60 in both the clockwise and counter-clockwise directions.

A pair of laterally-extending lobes 74 extend from opposing ends of the leading edge 68 of the sector gear 60, as shown in FIGS. 2A-2B and 4. Each of the lobes 74 includes an aperture 76 configured to be connected to an end of a corresponding tie rod 62. The sector gear 60 further includes an arcuate guide channel 78 positioned adjacent to the arcuately-shaped rack 72 and being substantially concentric therewith. The guide channel 78 is configured to receive the guide boss 50 that extends upwardly from the support block 28. The guide boss-guide channel relationship ensures proper rotation of the sector gear 60 relative to the support block 28 as well as provide hard stops to prevent the sector gear 60 from over-rotating in either the clockwise or counterclockwise direction. Rotation of the pinion gear 26 of the control assembly 16 is transferred into similar rotation of the sector gear 60 of the transfer assembly 18. The resulting rotational movement of the sector gear 60 is transferred into a steering force applied to the tie rods 62. As the sector gear rotates, the steering force applied to one of the tie rods 62 is a compression force while the steering force simultaneously applied to the other of the tie rods 62 is a tension force, and the opposite steering force is applied to the tie rods 62 when turned in the opposite direction.

Each tie rod 62 of the transfer assembly 18 is an elongated tube that extends between the sector gear 60 and a corresponding wheel assembly 20, as shown in FIGS. 2A-2B. The tie rods 62 are configured to convert the rotational movement of the sector gear 60 into rotational movement of the knuckle 80 through a linkage connection. In an embodiment, the tie rods 62 are substantially cylindrical, hollow members. Each tie rod 62 includes a first distal end attached one of the lobes 74 of the sector gear 60 and an opposing second distal end attached to a wheel assembly 20. The connecting mechanism 75 between a tie rod 62 and the sector gear 60 provides a continuous connection therebetween. For example, the connecting member 75 may be a ball-and-socket connector, a pinned connection, or any other similar connection. In the illustrated embodiment, the connecting member 75 between the tie rods 62 and the sector gear 60 is a ball-and-socket connector. As the pinion gear 26 transfers rotational movement from the control assembly 16 to the transfer assembly 18 through the rack 72, the rotation of the sector gear 60 is transferred to the wheel assemblies 20 by way of the tie rods 62 to a knuckle 80 of the wheel assembly 20.

Figure 5A:
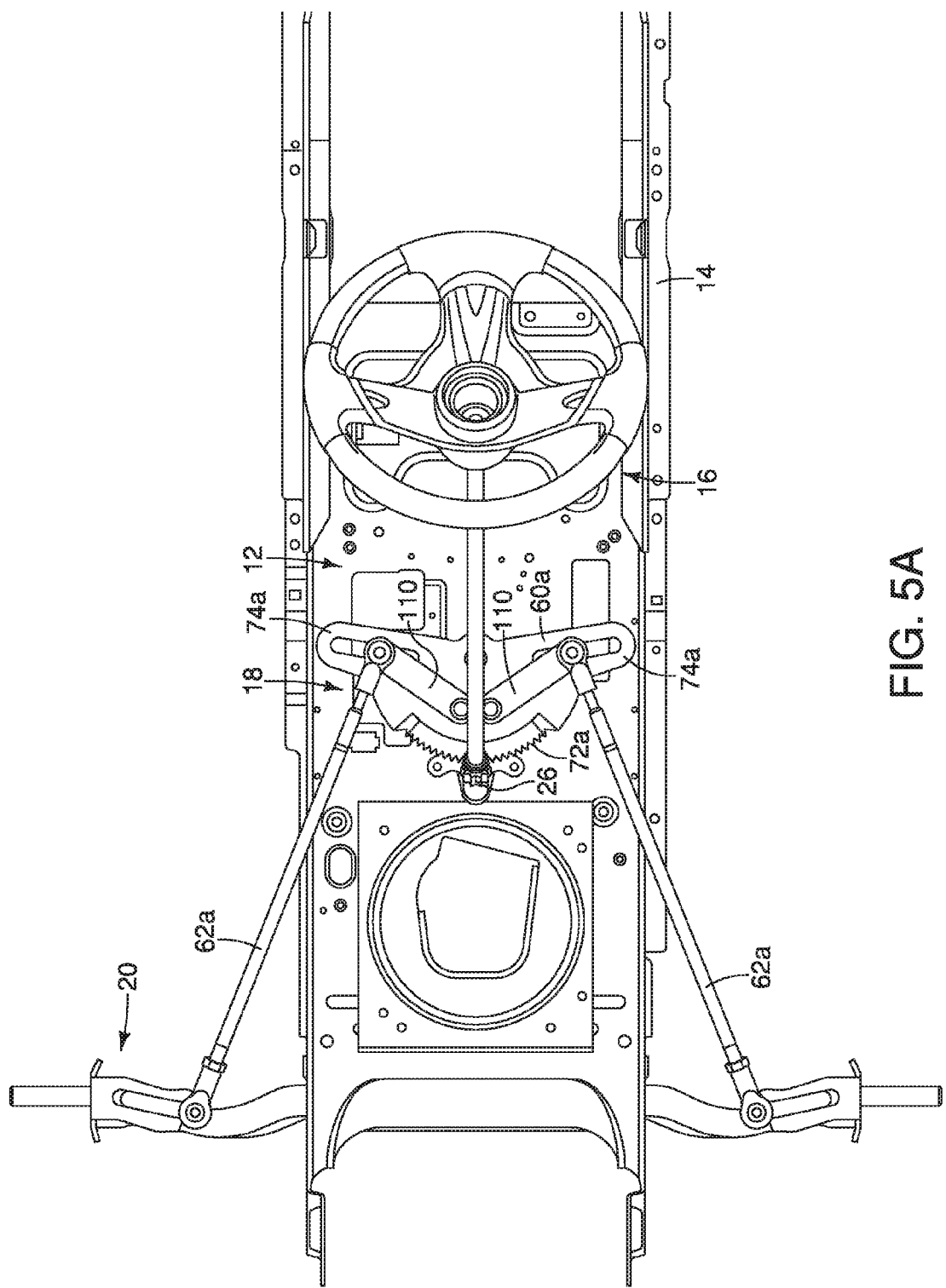
FIG. 5A is a top view of another embodiment of a steering assembly.
Figure 5B:
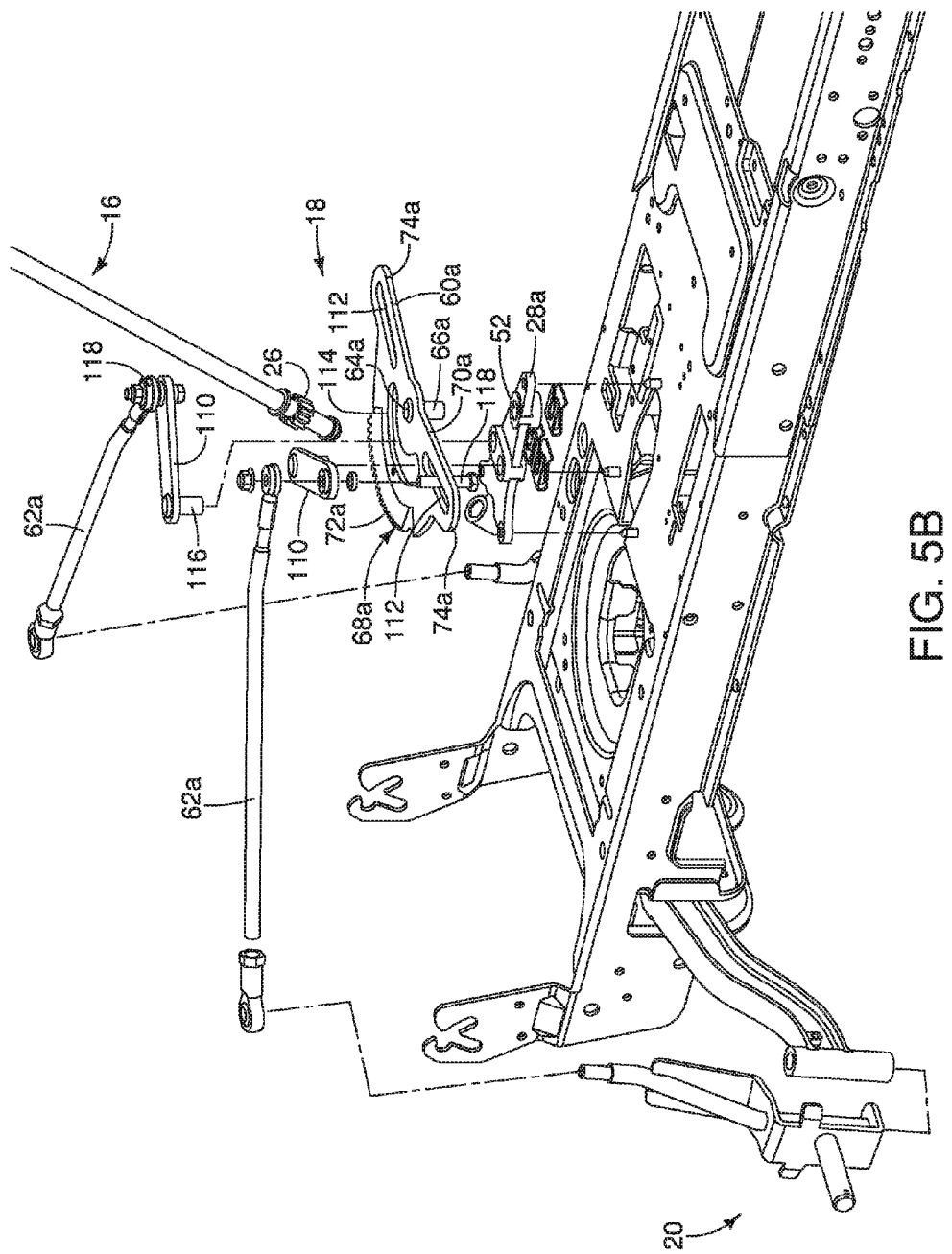
FIG. 5B is a rear perspective exploded view of the steering assembly shown in FIG. 5A.

Referring to FIGS. 5A-5B, another embodiment of the transfer assembly 18 is shown. The illustrated transfer assembly 18 includes a sector gear 60a that is engaged with the control assembly 16, a pair of links 110 in which each opposing end of each link 110 is slidingly engaged with the sector gear 60a, and a pair of tie rods 62a in which an end of each tie rod 62a is attached to one of the links 110. The transfer assembly 18 is configured to transfer the rotational output of the pinion gear 26 of the control assembly 16 into movement of the spaced-apart tie rods 62 which operate or otherwise change the position of the wheel assemblies 20.

In an embodiment, the sector gear 60a is a substantially semi-circular member having a central aperture 64a about which the sector gear 60a is rotatable, as shown in FIGS. 5A-5B. The sector gear 60a is rotatably connected to the support block 28a by way of a pin 66a that extends between the central aperture 64a of the sector gear 60a and the aperture 52 of the support block 28a. The sector gear 60a further includes an arcuate leading edge 68a and a pair of lobes 74a extending laterally from each end of the leading edge 68a. A trailing edge 70a extends in a generally linear manner between the opposing lobes 74a, but it should be understood by one of ordinary skill in the art that the trailing edge 70a may be formed as any shape as it extends between the opposing lobes 74a. At least a portion of the leading edge 68a forms a rack 72a, whereby the rack 72a includes a plurality of teeth extending forwardly. The teeth of the rack 72a are configured to engage with the pinion gear 26 attached to the steering shaft 24, whereby rotation of the pinion gear 26 is transferred to the sector gear 60a by way of the meshing teeth of the pinion gear 26 and the rack 72a. As the steering shaft 24 is rotated by the steering wheel 22, the teeth of the pinion gear 26 engage and drive the rack 72a of the sector gear 60a, thereby causing the sector gear 60a to rotate about the pin 66a that extends between the central aperture 64a of the sector gear 60a and the aperture 52 of the support block 28a.

The sector gear 60a further includes a pair of opposing slots 112, wherein each slot 112 is formed into one of the opposing lobes 74a, as shown in FIGS. 5A-5B. In an embodiment, the slots 112 are formed as linear apertures through the sector gear 60a. The slots 112 are configured to provide physical stops for the rotation of the wheel assemblies 20 operatively connected thereto so as to prevent over-rotation. The slots 112 are oriented at an angle relative to each other. The sector gear 60a also includes an arcuate slot 114 that is positioned between the slots 112 and the rack 72a. Each of the slots 112 and the arcuate slot 114 are configured to be connected to an end of a link 110, as explained below.

Each of the links 110 of the transfer assembly 18 are substantially linear members having an aperture formed therethrough at both opposing distal ends, as shown in FIGS. 5A-5B. The first distal end of both links 110 is rotatably connected directly to the support block 28 by way a fixed pin 116 extending through the aperture at the first distal end of each link 110. The fixed pin 116 coupling the first distal end of each link 110 to the support block 28 prevents translational movement of the first distal end of the links 110 while allowing rotation of the first distal end of the links 110 relative to the support block 28a about the axis of the fixed pin 116. Each fixed pin 116 extends through the first distal end of one of the links 110, through the arcuate slot 114 of the sector gear 60, and is then received within a corresponding recessed aperture formed in the support block 28a. The arcuate slot 114 is configured to allow the fixed pins 116 to remain stationary during a turning event, wherein the fixed pins 116 slid along the arcuate slot 114 as the sector gear 60a rotates relative to the fixed pins 116.

The second distal end of each of the links 110 is connected to an end of a tie rod 62a as well as a corresponding slot 112 of the sector gear 60a, as shown in FIGS. 5A-5B. The end of the tie rod 62a is attached to the second distal end of the link 110 by way of a connecting mechanism 75a formed as a ball-and-socket connector which includes an elongated rod, but it should be understood by one having ordinary skill in the art that any other mechanical connecting mechanism can be used to connect the tie rod 62 to one of the links 110. The elongated rod of the connecting mechanism 75a extends downwardly from the bottom of the link 110 and is received in one of the slots 112. The elongated rod of the connecting mechanism 75a is configured to slide along the slot 112 during a turning even in response to rotation of the sector gear 60a. The connecting mechanism-slot connection reduces or eliminates problems associated with manufacturing tolerances in the steering assembly 12. In operation, as the sector gear 60*a* rotates about the pin 66*a*, the elongated rod of each connecting mechanism 75*a* slides along the corresponding slot 112 while simultaneously transferring the rotational movement of the sector gear 60*a* to the corresponding tie rod 62*a*, wherein each tie rod 62*a* is attached to a corresponding wheel assembly 20.

Each tie rod 62*a* of the transfer assembly 18 includes a first distal end and a second distal end, wherein the first distal end of the tie rod 62*a* is operatively connected to a link 110 and the second distal end of the tie rod 62*a* is connected to a wheel assembly 20, as shown in FIGS. 5A-5B. The tie rod 62*a* is configured to transfer rotational movement of the sector gear 60*a* to the wheel assembly 20.

In the illustrated exemplary embodiment, each wheel assembly 20 includes a knuckle 80, a rim 82, and a tire 84 is attached, and a kingpin 99, as shown in FIGS. 2B and 6. The knuckles 80 are rotatably connected to the pivot bar 86 which is a horizontally-oriented beam that is positioned substantially perpendicular to the longitudinal orientation of the frame 14. Each knuckle 80 is operatively connected to the pivot bar 86 by a kingpin 99, wherein the kingpin 99 is substantially vertically oriented. The pivot bar 86 is rotatably attached to the frame 14 to allow for relative vertical movement of the opposing wheel assemblies 20 relative to each other. Each knuckle 80 is configured to receive the steering force from a tie rod 62 which causes the corresponding tire 84 to be turned. The knuckles 80 illustrated in FIG. 6 are formed of multiple pieces attached together, such as a J-rod that is attachable to the tie rod 62 and is received by the pivot bar 86, a U-bracket attached to the J-rod, and a mounting pin to which the rim 82 and tire 84 are attached. The portion of the J-rod received in the pivot bar 86 forms the kingpin of the wheel assembly 20.

Figure 7A:
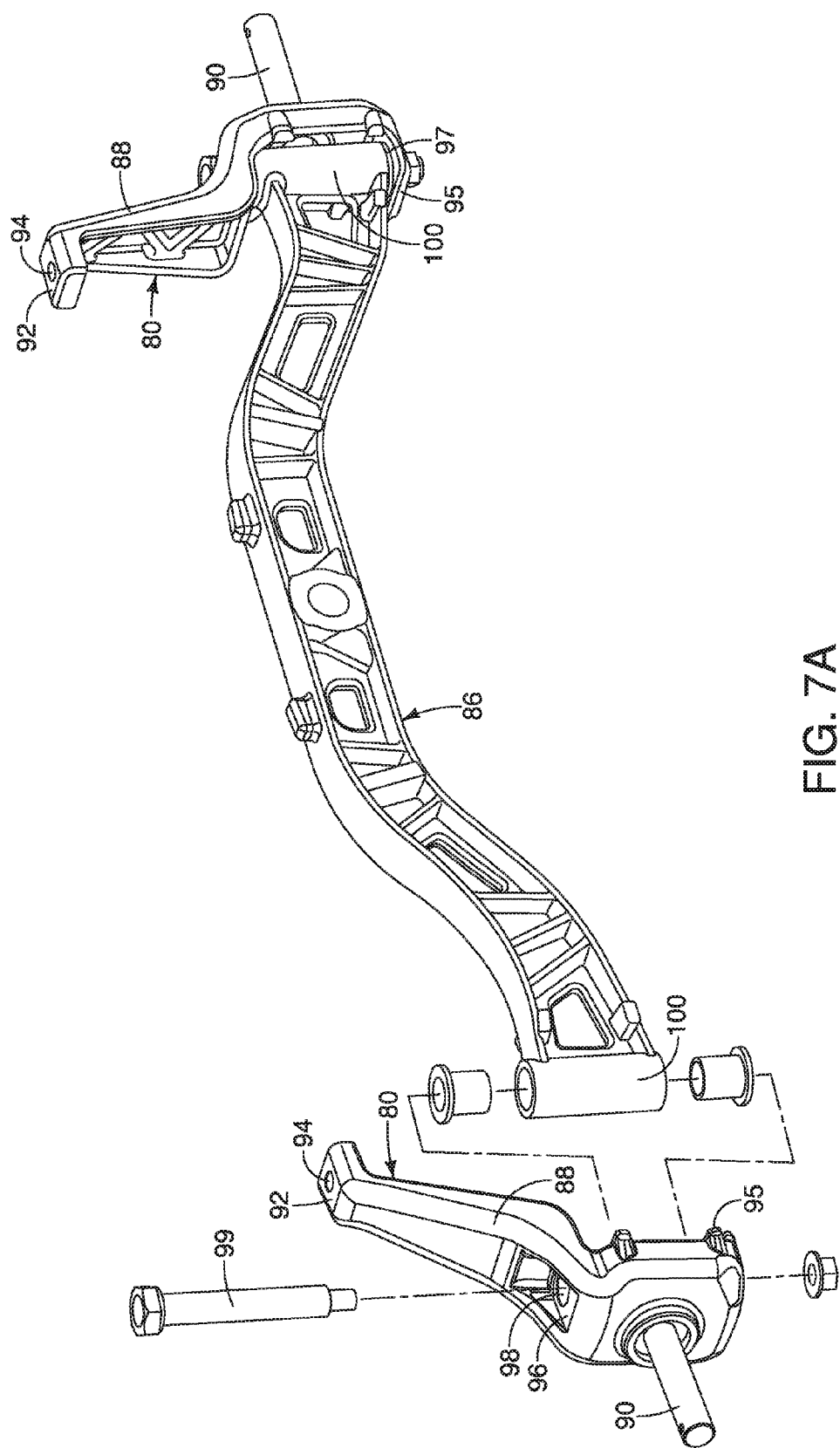
FIG. 7A is an exploded front perspective view of an embodiment of a wheel assembly.
Figure 7B:
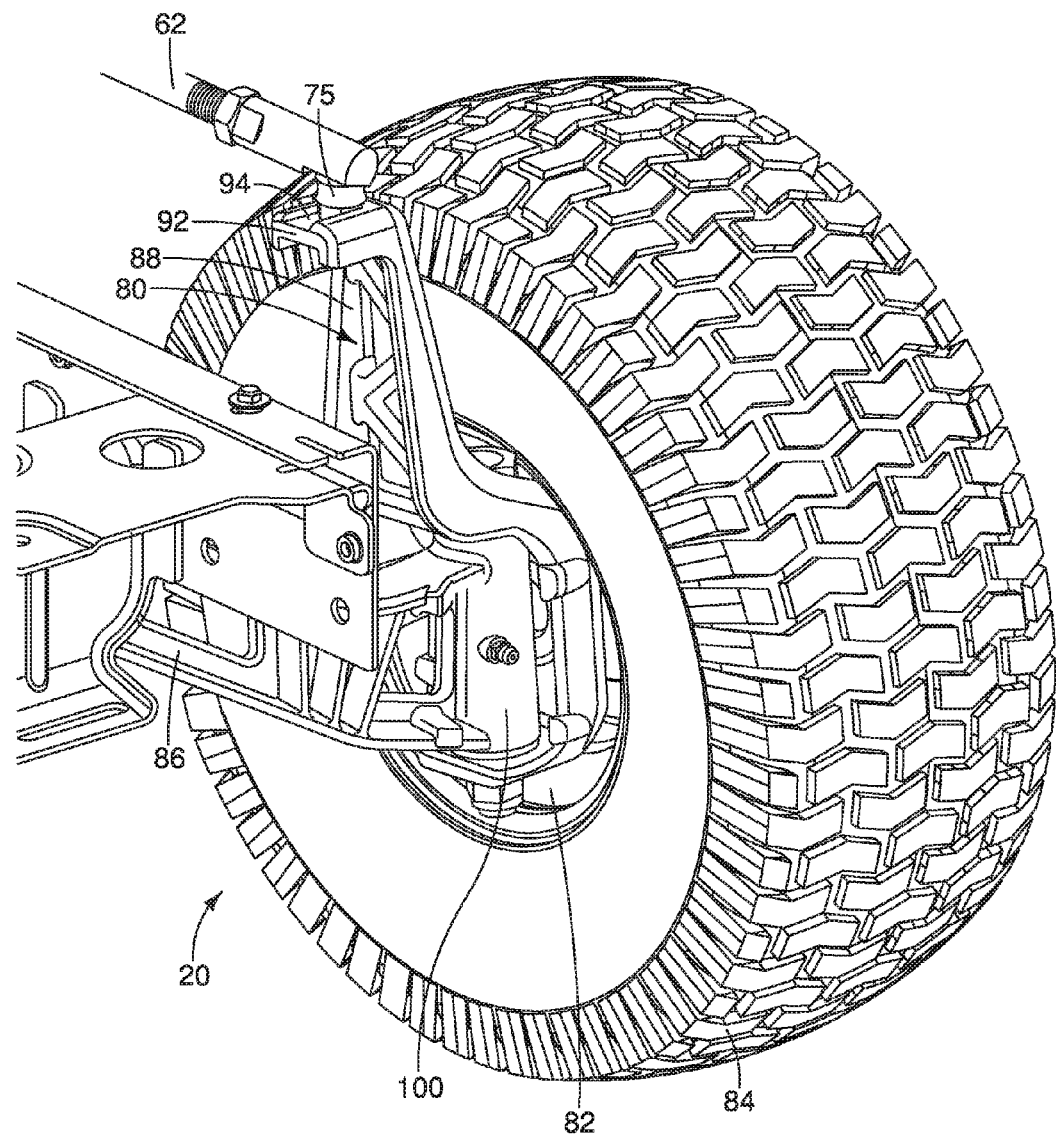
FIG. 7B is a front perspective view of the wheel assembly shown in FIG. 7A.

FIG. 6 shows another embodiment of a knuckle 80, wherein the knuckle 80 is formed of a cast body 88 and an axle 90 operatively connected to the body 88. The axle 90 is configured to be received by the rim 82, and the tire 84 is mounted on the rim 82. The axle 90 is an elongated cylindrical member that is rotatable about its longitudinal axis and relative to the body 88, thereby allowing the tire 84 to rotate relative to the body 88 of the knuckle 80. The body 88 includes a horizontally-aligned upper landing 92 having an aperture 94 formed therethrough. The tie rod 62 is attached to the upper landing 92, and the aperture 94 is configured to receive a connecting mechanism for attaching the tie rod 62 to the knuckle 80, as shown in FIG. 7B. In an embodiment, a connecting mechanism 75, formed as a ball-and-socket connector, is used to connect a tie rod 62 to the upper landing 92 of the knuckle 80, but it should be understood by one having ordinary skill in the art that any other fastening mechanism can be used. The connecting mechanism 75 formed as a ball-and-socket connector allows the tie rod 62 to remain attached to the knuckle 80 during turning events as well as when the wheel assembly 20 is raised or lowered along with the pivot bar 86 as the vehicle 10 is driven over uneven terrain. The vertical height of the upper landing 92, relative to the axle 90, should be of sufficient height to ensure that the tie rod 62 clears the tire 84 when the wheel assembly 20 is in a full-turn such that the tie rod 62 does not contact the tire 84. During the full-turn, or locked position, the tie rod 62 in the direction of the turn extends over the top of the corresponding tire 84.

The knuckle 80, as shown in FIGS. 6 and 7A-7C, also includes a central landing 96 having an aperture 98 formed therethrough. The knuckle 80 further includes a lower landing 95 with a corresponding aperture 97 formed therethrough, which is on the rear of the body 88. The apertures 98, 97 in the central and lower landings 96, 95 are aligned and configured to receive a kingpin 99 that extends through both apertures as well as a corresponding boss 100 of the pivot bar 86. The knuckle 80 is rotatable about the kingpin 99, whereby the kingpin 99 provides an axis of rotation about which the entire wheel assembly 20 rotates relative to the pivot bar 86 during a turn.

The steering forces from a tie rod 62 are transferred to the wheel assembly 20 through the connection between the tie rod 62 and the upper landing 92 of the knuckle 80. When the steering forces exerted on the tie rod 62 result in compression, the knuckle 80 is "pushed" forwardly, wherein the corresponding rim 82 and tire 84 rotate outwardly away from the frame 14. Similarly, when the steering forces exerted on the tie rod 62 result in tension, the knuckle 80 is "pulled" rearwardly, wherein the corresponding rim 82 and tire 84 rotate inwardly toward the frame 14.

Figure 7C:
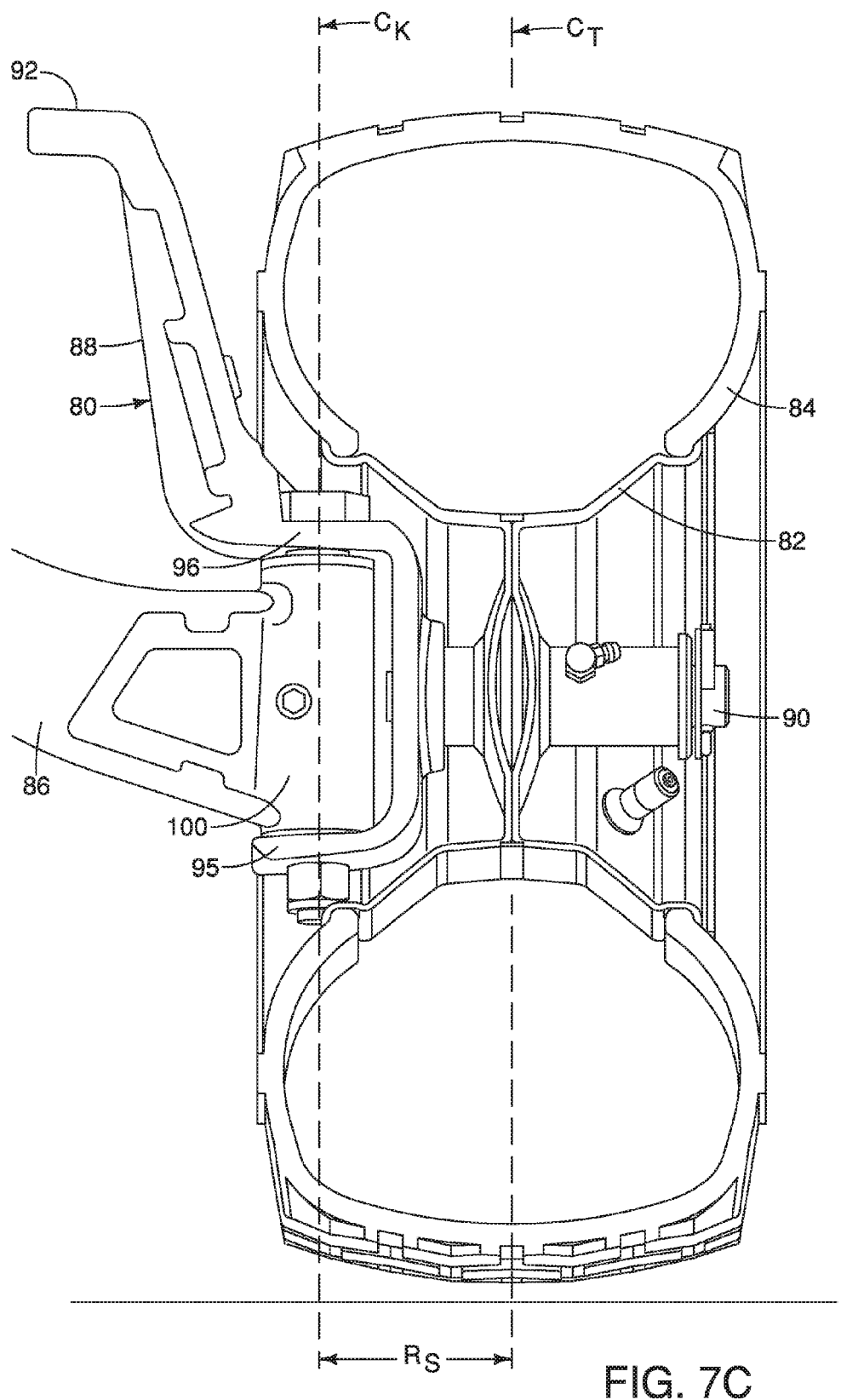
FIG. 7C is a front cross-sectional view of the wheel assembly shown in FIG. 7A.

The scrub radius $R_S$, as shown in FIG. 7C, is the distance between the vertical centerline of the tire $C_T$ and the location at which the kingpin axis $C_K$ intersects the ground. As the scrub radius $R_S$ becomes larger, it becomes more difficult to turn the steering wheel 22, because the increased scrub radius $R_S$ causes the tires to be dragged around a turn. A low scrub radius $R_S$ keeps the steering efforts low such that the steering effort mostly consistent throughout the entire turning radius of the vehicle 10. As such, the wheel assembly 20 illustrated in FIGS. 7B-7C provides a reduced scrub radius $R_S$ by configuring the knuckle 80 such that the kingpin 99 is positioned within the rim 82 of the tire 84 as well as by reducing the vertical angle (in the lateral direction) of the kingpin axis $C_K$. The boss 100 of the pivot bar 86 is oriented substantially vertically (in the lateral direction with respect to the longitudinal axis of the vehicle 10) such that the kingpin axis $C_K$ is also substantially vertically oriented, thereby reducing the vertical angle of the kingpin axis $C_K$. The combination of the low kingpin angle and the low scrub radius $R_S$ results in easier steering in turns, and particularly in tight turns in which the wheel assemblies are turned to their full turn, or locked position. By having an in-wheel kingpin 99 that is substantially vertically-aligned along with a reduced scrub radius $R_S$, the movement of the pivot bar 86 during turning operations is reduced or eliminated. The elimination of this movement results in improved cut quality of the grass as well as reducing the effort required to steer during a turn. This also reduces the stresses in the tie rods 62 and the knuckles 80 due to the reduction of cantilevered loading. In the embodiment illustrated in FIG. 7C, the scrub radius is between about 0.0 inches (0.0") and 1.5 inches (1.5"). In other embodiments, the scrub radius is greater than 0.0 inches (>0.0"), or at least 0.0 inches (>0.0").

When the kingpin is located outside of the rim of the tire, a larger positive camber on the outside tire during a tight turn is used to create a lower scrub radius, and thus reducing the steering effort. This is the opposite effect needed for optimal grip between the tire and the ground. The large positive camber also causes the kingpin located outside the rim of the tire to rotate an amount significant enough to cause the front axle of the lawn maintenance vehicle 10 to raise on the outside tire (and lower on the inside tire), thereby resulting in a mower deck that similarly raises and lowers and thus reducing the cut quality of the grass. By positioning the kingpin 99 within the rim 82 of the tire 84, as described above and shown in FIGS. 7B-7C, the positive camber is reduced or eliminated, which in turn eliminates the tire roll and scrub associated with the outer tire 84 during a tight turn. Additionally, because the positive camber is eliminated, the outer tire 84 during a tight turn does not roll which results in more tread of the tire 84 contacting the ground. As a result, there is lower ground compaction and less turf defacement during a tight turn.

While preferred embodiments of the present invention have been described, it should be understood that the present invention is not so limited and modifications may be made without departing from the present invention. The scope of the present invention is defined by the appended claims, and all devices, processes, and methods that come within the meaning of the claims, either literally or by equivalence, are intended to be embraced therein.

What is claimed is:

1. A steering assembly for a lawn maintenance vehicle having a frame, said steering assembly comprising:
    a control assembly including a steering wheel operatively connected to a pinion gear;
    a transfer assembly including a sector gear and a pair of tie rods, wherein said sector gear is operatively connected to said frame and rotatable relative thereto, said sector gear having an arcuate leading edge forming a rack that is meshingly engaged with said pinion gear, said leading edge forming said rack of said sector gear is directed forwardly, said pair of tie rods being operatively connected to said sector gear; and
    a pair of wheel assemblies, wherein each tie rod of said transfer assembly is attachable to one of said wheel assemblies, and movement of said tie rods in response to rotation of said sector gear causes said wheel assemblies to rotate.

2. The steering assembly of claim 1, wherein each of said wheel assemblies includes a knuckle having an axle attached thereto, a rim receiving said axle, and a tire mounted on said rim.

3. The steering assembly of claim 2, wherein said knuckle of each of said wheel assemblies is operatively connected to a pivot bar by a kingpin, said pivot bar being operatively connected to said frame.

4. The steering assembly of claim 3, wherein each kingpin is substantially vertically aligned.

5. The steering assembly of claim 3, wherein each kingpin is positioned within said rim.

6. The steering assembly of claim 5, wherein said kingpin positioned within said rim generates a scrub radius between about 0.0 inches and 1.5 inches.

7. The steering assembly of claim 2, wherein each of said knuckles is formed of a cast body.

8. A steering assembly for a lawn maintenance vehicle having a frame, said steering assembly comprising:
    a control assembly including a steering wheel operatively connected to a pinion gear, wherein rotation of said steering wheel is directly transferred to said pinion gear;
    a transfer assembly including a sector gear and a pair of tie rods, said sector gear having a leading edge forming a rack that is meshingly engaged with said pinion gear, and each of said tie rods having one end connected to said sector gear; and
    a pair of wheel assemblies, wherein each wheel assembly includes a knuckle, a kingpin for attaching said knuckle to a pivot bar operatively connected to said frame, an axle extending from said knuckle, a rim rotatably attached to said axle, and a tire mounted on said rim, said knuckle being connected to another end of one of said tie rods;

wherein said kingpin is located within said rim.

9. The steering assembly of claim 8, wherein each knuckle is formed of a cast body having an upper landing having an aperture formed therethrough, a central landing having an aperture formed therethrough, and a lower landing having an aperture formed therethrough.

10. The steering assembly of claim 9, wherein said kingpin extends through said aperture in said central landing, a substantially vertically-aligned boss of said pivot bar, and said aperture in said lower landing.

11. The steering assembly of claim 9, wherein one of said pair of tie rods is attached to said upper landing of each of said knuckles.

12. The steering assembly of claim 9, wherein said upper landing of each of said knuckles extends vertically a sufficient distance to allow said tie rod to clear said tire during a tight turn.

13. A steering assembly for a lawn maintenance vehicle having a frame, said steering assembly comprising:
    a control assembly including a steering wheel, a pinion gear, and a steering shaft extending between said steering wheel and said pinion gear;
    a transfer assembly including a sector gear and a pair of tie rods, said sector gear having a leading edge forming a rack that is meshingly engaged with said pinion gear, and each of said tie rods operatively connected to said sector gear; and
    a pair of wheel assemblies, wherein each wheel assembly includes a knuckle, a kingpin for attaching said knuckle to a pivot bar that is operatively connected to said frame, an axle extending from said knuckle formed of a cast body, a rim rotatably attached to said axle, and a tire mounted on said rim, said knuckle being connected to another end of one of said tie rods;

wherein a scrub radius generated by said kingpin being between about 0.0 inches and 1.5 inches.

* * * * *